(No Model.)
2 Sheets—Sheet 1.
J. W. PUTNAM.
APPARATUS FOR TREATING TIMBER FOR PRESERVING IT.
No. 247,947.
Patented Oct. 4, 1881.
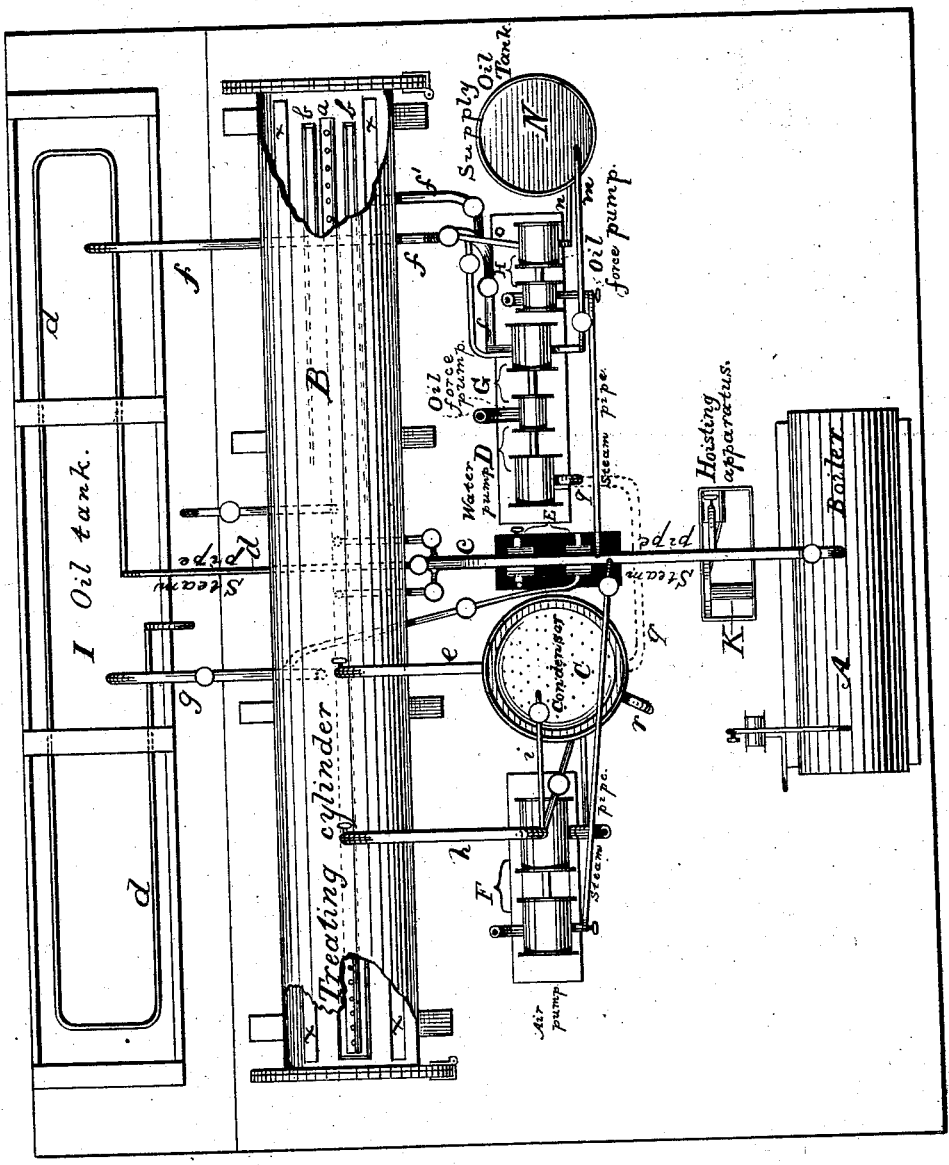
WITNESSES:
Thos. Houghton.
Amos W. Hart.
INVENTOR:
J. W. Putnam
BY
ATTORNEYS.

(No Model.) 2 Sheets—Sheet 2.
J. W. PUTNAM.
APPARATUS FOR TREATING TIMBER FOR PRESERVING IT.
No. 247,947. Patented Oct. 4, 1881.
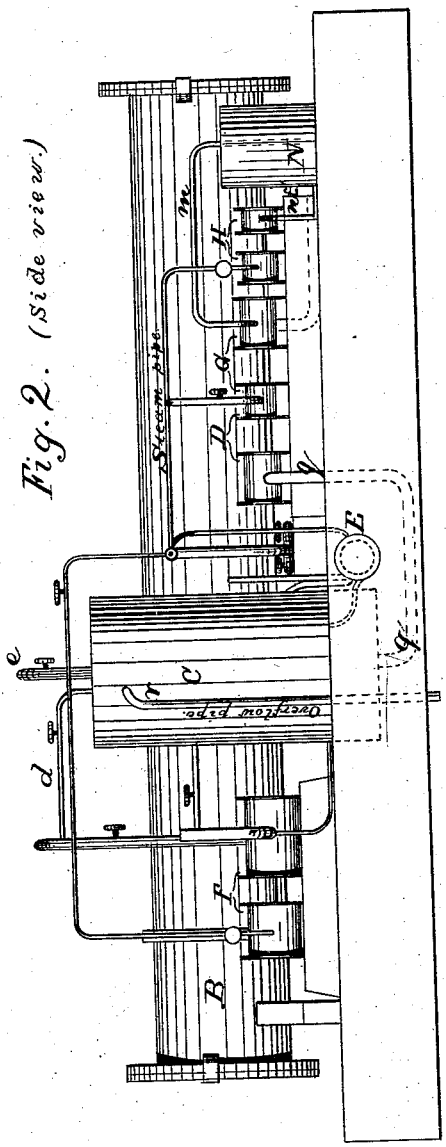
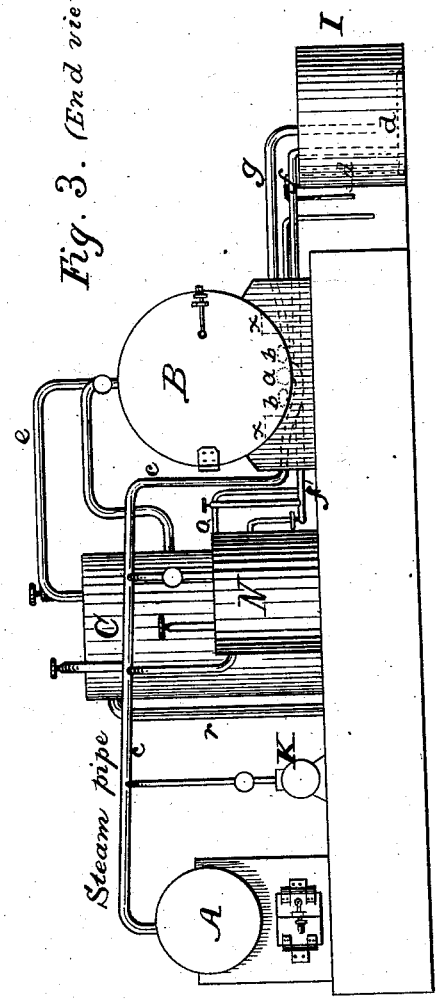
WITNESSES:
Thos. Houghton.
Amos W. Hart.
INVENTOR:
J. W. Putnam
BY
ATTORNEYS.

UNITED STATES PATENT OFFICE.

JOSEPH W. PUTNAM, OF NEW ORLEANS, LOUISIANA.

APPARATUS FOR TREATING TIMBER FOR PRESERVING IT.

SPECIFICATION forming part of Letters Patent No. 247,947, dated October 4, 1881.

Application filed April 22, 1881. (No model.)

*To all whom it may concern:*

Be it known that I, JOSEPH W. PUTNAM, of New Orleans, in the parish of Orleans and State of Louisiana, have invented a new and Improved Apparatus for Treating Timber for Preserving it; and I do hereby declare that the following is a full, clear, and exact description of the same.

The nature of this invention relates to the preservation of wood from decay, whereby the sap and other volatile elements contained in the wood and inducing decay are removed and their place supplied by antiseptic agents, leaving the wood unimpaired in its organic structure and its chemical character unchanged.

The invention is more particularly an improved vacuum apparatus by which the wood is first subjected to a steam bath, the steam then condensed to produce a vacuum, and a comparatively high temperature being maintained in the treating-chamber during the production and continuance of the vacuum; and lastly, oleaginous and preservative material is admitted (under pressure) to supply the vacuum and permeate the pores of the wood.

In the accompanying drawings, forming part of this specification, Figure 1 is a plan view of my improved apparatus, portions of the treating-cylinders being broken out. Fig. 2 is a side elevation of the main portion of the apparatus. Fig. 3 is an end elevation.

A indicates a steam-boiler; B, the treating cylinder or chamber, and C the condenser. An air-pump, F, waste or condensed water pump E, and water-supply pump D are connected with the condenser.

The letter G indicates a force-pump for supplying oil to the treating-chamber.

N is a small supplementary oil-tank, into which oil is pumped from the main tank I for supplying the force-pump G.

The boiler A may be of any approved construction.

The windlass K is used for hauling logs and hewn timber into proximity to the treating-chamber B, more especially for hauling the trucks loaded with timber into and out of said chamber. A perforated pipe, $a$, and imperforate pipe $b$ are laid along the bottom of the treating-chamber, as shown in Figs. 1 and 3, and suitably connected to branches of the main steam-pipe $c$. Another branch, $d$, leads from pipe $c$ into the oil-tank C, and is extended around the bottom of the same for the purpose of heating the oil when in a crystalline condition, thus increasing its fluidity and adapting it to flow rapidly.

The logs or timber to be treated are drawn into the chamber B upon the iron trucks which run on the rails. The doors of the chamber are then closed, and steam admitted through the perforated pipe $a$, and also allowed to circulate simultaneously in the adjacent imperforate pipe $b$. The timber is subjected to this treatment until well heated, the time being varied according to the kind, condition, and size of the pieces, the temperature of the chamber being during that time about 265° Fahrenheit, which is nearly the maximum heat short of carbonization of the wood. The steam is then shut off from the perforated pipe $a$, and the chamber B allowed to exhaust through pipe $e$ into the condenser C. The vacuum thus created is maintained, and the steam also continually circulated in the pipe $b$ from ten to thirty-six hours, although in most cases this treatment is continued about twenty-four hours. The absence of pressure and application of heat cause a very rapid and complete vaporization and evaporation of the sap and other volatile substances in the timber, and thus produce the condition required to allow the thorough impregnation of the timber with the antiseptic or preservative oleaginous material. After the timber has been thus treated in vacuo for the time stated, creosote or other preferred oil is allowed to enter the chamber B from tank I through the pipes $g\ f$, the latter having a circuitous connection with the chamber through the medium of pipe $f'$. When the vacuum has been supplied to the extent of the atmospheric pressure on the oil in tank I the pipe $g$ is shut off and the supply continued by working the suction-pump G. The oil is drawn into the chamber of this pump through pipe $f$, and forced into the chamber B through pipes $f'$, the stopcocks attached to the said pipes being suitably adjustable for the purpose. When the pressure of oil in the chamber B has reached a high degree, the connection of the pump G with the oil-chamber B is cut off, and the action of the pump continued for the purpose of filling the tank N. In this case the current is diverted through the short pipe m, Fig. 1. The pump G is then stopped and the more powerful force-pump H set to work. The latter draws its supply from the tank N through pipe n, and conveys it into the chamber B through pipes o f, and is kept in operation until the gage indicates a pressure of from one hundred to one hundred and fifty pounds in the chamber, the same being varied, as required, for the various kinds or conditions of the timber or the use for which it is to be employed. The timber will become thoroughly impregnated with the oil in a few hours, and the surplus oil is then allowed to flow back into the tank I through the pipes f g to be again utilized in treating the next lot of timber.

The condenser C consists of a casing and an inner portion, which is substantially similar in construction to an ordinary vertical tubular boiler. The water supplied by pump D through pipe q fills the condenser-tubes themselves, and also the annular space between them and the casing and overflows through pipe r. The steam exhaust from chamber B takes place into the intertubular space. The steam condensed in the condenser C and also in the chamber B is drawn off by the pump E, which is necessarily located below their level, as shown, Fig. 2, for the purpose of allowing the pipes to fill by the action of gravity.

An air-pump, F, is employed for extracting the air from the chamber B and condenser C, which would otherwise prevent the desired vacuum being produced. The connection is by means of pipes h i.

Having thus described my invention, what I claim as new is—

In an apparatus for treating timber for preserving it, the combination, with the treating-cylinder and storage-tank located at a lower point, of the suction and force pump, suction and discharge pipes f f' g, as shown, and the supplementary oil-tank, all arranged as shown and described, to operate as specified.

J. W. PUTNAM.

Witnesses:
SOLON C. KEMON,
AMOS W. HART.